United States Patent
Chu

(10) Patent No.: US 7,469,155 B2
(45) Date of Patent: Dec. 23, 2008

(54) HANDHELD COMMUNICATIONS DEVICE WITH AUTOMATIC ALERT MODE SELECTION

(75) Inventor: Steve C. Chu, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 103 days.

(21) Appl. No.: 10/998,479

(22) Filed: Nov. 29, 2004

(65) Prior Publication Data

US 2006/0116175 A1    Jun. 1, 2006

(51) Int. Cl.
 H04B 1/38    (2006.01)
 H04B 1/00    (2006.01)
 H04Q 7/20    (2006.01)

(52) U.S. Cl. .................. 455/567; 455/456.1; 455/456.4

(58) Field of Classification Search ................. 455/567, 455/456.1, 456.6, 456.4, 456.2
See application file for complete search history.

(56) References Cited

U.S. PATENT DOCUMENTS

| | | | |
|---|---|---|---|
| 4,805,210 A | 2/1989 | Griffith, Jr. | |
| 5,432,844 A | 7/1995 | Core et al. | |
| 5,608,786 A | 3/1997 | Gordon | |
| 5,615,213 A | 3/1997 | Griefer | |
| 5,794,218 A | 8/1998 | Jennings et al. | |
| 5,937,040 A | 8/1999 | Wrede et al. | |
| 5,999,599 A | 12/1999 | Shaffer et al. | |
| 6,044,081 A | 3/2000 | Bell et al. | |
| 6,226,536 B1 * | 5/2001 | Miyashita | 455/567 |
| 6,259,405 B1 | 7/2001 | Stewart et al. | |
| 6,271,764 B1 * | 8/2001 | Okamura | 340/7.2 |
| 6,438,600 B1 | 8/2002 | Greenfield et al. | |
| 6,526,293 B1 * | 2/2003 | Matsuo | 455/573 |
| 6,545,596 B1 | 4/2003 | Moon | |
| 6,564,261 B1 | 5/2003 | Gudjonsson et al. | |
| 6,587,680 B1 | 7/2003 | Ala-Laurila et al. | |
| 6,643,774 B1 | 11/2003 | McGarvey | |

(Continued)

FOREIGN PATENT DOCUMENTS

JP    11068648 A  *  3/1999

OTHER PUBLICATIONS

How to Build Smart Appliances, Albercht Schmidt, Kristof Van Laerhoven, IEEE Personal Communications, Aug. 2001, pp. 66-71.

*Primary Examiner*—George Eng
*Assistant Examiner*—Wesley L Kim
(74) *Attorney, Agent, or Firm*—The Law Offices of Bradley J. Bereznak

(57) ABSTRACT

Apparatus for automatically alerting a user of a handheld communications device of an incoming transmission includes a plurality of sensors each of which produces a signal indicative of a physical parameter of a surrounding environment of the handheld communications device. Also included is a processor that executes a programmed set of instructions to determine an optimal alert mode setting based on a combination of the sensor signals. A plurality of output units produces one or more sensory alert outputs In response to the optimal alert mode setting. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

13 Claims, 3 Drawing Sheets

U.S. PATENT DOCUMENTS

| | | |
|---|---|---|
| 6,654,455 B1 | 11/2003 | Isaka |
| 6,769,000 B1 | 7/2004 | Akhtar et al. |
| 6,792,297 B2 | 9/2004 | Cannon et al. |
| 6,798,874 B1 | 9/2004 | Ohlinger et al. |
| 6,816,469 B1 | 11/2004 | Kung et al. |
| 6,839,761 B2 | 1/2005 | Kadyk et al. |
| 6,847,715 B1 | 1/2005 | Swartz |
| 6,870,835 B1 | 3/2005 | Chen et al. |
| 6,876,734 B1 | 4/2005 | Summers et al. |
| 6,905,414 B2 | 6/2005 | Danieli et al. |
| 6,907,123 B1 | 6/2005 | Schier |
| 6,912,275 B1 | 6/2005 | Kaplan |
| 6,917,672 B2 | 7/2005 | Brown et al. |
| 6,918,034 B1 | 7/2005 | Sengodan et al. |
| 6,931,001 B2 | 8/2005 | Deng |
| 6,934,858 B2 | 8/2005 | Woodhill |
| 6,947,417 B2 | 9/2005 | Laursen et al. |
| 6,985,745 B2 | 1/2006 | Quaid |
| 6,987,744 B2 | 1/2006 | Harrington et al. |
| 2002/0010008 A1* | 1/2002 | Bork et al. .................. 455/567 |
| 2002/0068537 A1* | 6/2002 | Shim et al. ............... 455/177.1 |
| 2002/0086680 A1 | 7/2002 | Hunzinger |
| 2002/0178228 A1 | 11/2002 | Goldberg |
| 2002/0198004 A1* | 12/2002 | Heie et al. .................. 455/456 |
| 2003/0061496 A1 | 3/2003 | Ananda |
| 2003/0176205 A1* | 9/2003 | Oota et al. .................. 455/567 |
| 2004/0248586 A1* | 12/2004 | Patel et al. ................ 455/456.1 |
| 2005/0157708 A1 | 7/2005 | Chun |
| 2005/0177622 A1 | 8/2005 | Spielman et al. |
| 2005/0272413 A1 | 12/2005 | Bourne |
| 2006/0034336 A1 | 2/2006 | Huh et al. |

* cited by examiner

HANDHELD COMMUNICATIONS DEVICE WITH AUTOMATIC ALERT MODE SELECTION

FIELD OF THE INVENTION

The present invention relates generally to the field of digital communication systems and circuits; more specifically, to monitoring and control circuitry for portable (i.e., handheld) communications devices.

BACKGROUND OF THE INVENTION

The past few decades has produced explosive growth in the consumer markets for handheld communications devices such as mobile ("cell") phones, pagers, two-way pagers, walkie-talkie devices, portable or wireless email devices including personal digital assistants (PDAs), laptop computers, and the like. During operation, these types of devices receive incoming communication transmissions or calls that require the attention of the user. These communication transmissions can be in the form of incoming voice messages, data messages, cellular telephone calls, or other radio transmissions. Examples of message delivery and basic radio communications systems are found in U.S. Pat. Nos. 6,804,334 and 6,421,544.

Many handheld communications devices are capable of being manually set so as to notify the user of an incoming call or event through either and audible, visual or vibration signal queue. Most wireless cell phones and pagers, for example, permit a user to set the handheld device to operate in one of a variety of alert modes. Commonly available alert modes include different ring tone settings, each with a selectable volume control, and a silent vibration mode. Many cell phones also include a "hands-free" or voice command setting that may be utilized when the user is driving an automobile, operating machinery, or is otherwise unable to manually operate the device.

One problem that arises, however, is that the user is constantly required to change the appropriate alert mode setting and adjust the volume controls of the handheld device depending on the environment that the user is currently in. By way of example, a person typically must turn their cellular telephones off, or place them in a silent or vibration mode, prior to entering a meeting room, hospital, courtroom, prison, or other similar location where noise disruptions or communications are prohibited. This poses a significant burden for the user, as they must be constantly mindful of their environment—including the appropriateness of their current location for receiving incoming transmissions—and vigilantly program their handheld communications device accordingly.

Another related drawback of prior art portable communications devices is that they may be inadvertently left in an old setting that is inappropriate for the user's new, current environment. For example, a wireless cell phone user may forget to change the alert mode setting of his telephone before entering a meeting or conference. In such a setting, the loud ring of an incoming call may be annoying and disruptive. On the other hand, a person who manually places their cell phone in a mute or silent setting prior to a meeting, and who forgets to change that setting after leaving the meeting, may miss important incoming calls for failure to be adequately alerted.

Various technologies have been developed in an attempt to ease the numerous burdens imposed on users of handheld communications devices. For example, U.S. Pat. No. 6,792, 296 teaches a system and method of automatically configuring a portable wireless communications device when the device is connected to a hands-free control unit in a vehicle. The wireless communications device obtains information from the vehicle, such as data associated with a power loss for communicating through an external antenna of the vehicle, when it is connected to the control unit. Each of these elementary streams has a Packet Identifier (PID) that uniquely identifies that stream within the larger transport stream.

Similarly, U.S. Pat. No. 6,799,052 discloses a hand-held cellular telephone system that incorporates a high resolution global positioning system (GPS) circuit into a cell phone unit. A cell base station communications server inhibits transmissions to the cell phone user when it is determined that the cell phone is in a specific restricted area based on GPS location information.

In another approach, U.S. Pat. No. 6,792,297 0teaches a system and method for indicating battery charging information to cell phone users when the cell phone is near an associated battery charger. The charger and cell phone are adapted to establish a communications link with each other when the cell phone is within a predetermined proximity range of the charger. The link allows either the charger or cell phone to analyze the status of the telephone's battery and, when appropriate, warn or remind the user to charge the battery based on the results of the analysis.

In still another improvement to cellular telephone technology, U.S. Patent Application Publication No. 2004/0131206 discloses a telecommunications device that provides the user with a selectable digital audio equalizer to compensate for frequency-dependent attenuation or ambient noise in the received audio signal. The digital audio equalizer applies an audio frequency profile to the received audio signal, thereby attenuating some frequencies and/or amplifying others. The user selects which audio profile they prefer by manually pressing buttons on the cordless telephone. In this manner the user may select an audio profile which best matches the user's personal hearing spectrum.

Although these various techniques have helped to alleviate certain specific problems associated with portable communications devices, there still remains an unsatisfied need for a better and more comprehensive solution to the problem of alerting a user of a handheld communications device of incoming transmissions in view of ever changing environments.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Apparatus and method for automatic alert mode selection in a portable or handheld communications device is described. In the following description, numerous specific details are set forth, such as device types, operating modes, configurations, etc., in order to provide a thorough understanding of the present invention. However, persons having ordinary skill in the networking arts will appreciate that these specific details may not be needed to practice the present invention.

According to the present invention a handheld communications device is provided that includes an "auto alert mode" setting that automatically switches between different alert modes on a dynamic basis depending on current sampled environmental conditions. With the auto alert mode selection feature, an optimal user alert is automatically selected without user intervention using a computer-implemented algorithm that intelligently analyzes a multitude of input data obtained from environmental sensors. These sensors may include a wide variety of well-known electronic sensors, including: infrared, ultrasonic, decibel-level, light intensity, capacitive/inductive proximity, noise, heat, speech, music, GPS, physical orientation, motion-detection, and wireless network detection sensors.

It should be understood that in the context of the present invention, the term "handheld communications device" refers broadly to any portable electronic device capable of receiving incoming communications or calls. Examples of handheld communications device include wireless phones, cellular telephones, pagers, two-way pagers, portable GPS receivers, walkie-talkie devices, and wireless email devices such as personal digital assistants (PDAs) and laptop computers, or any other portable communications device.

Figure 1:
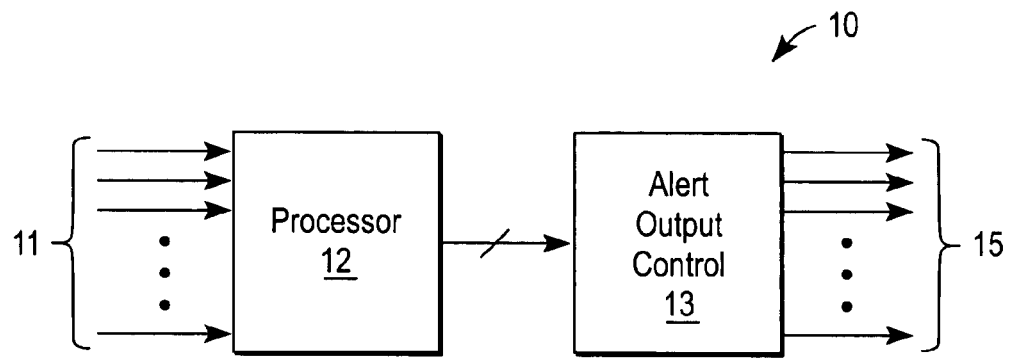
FIG. 1 is a high-level circuit block diagram of the dynamic alert mode control circuitry of the present invention.

FIG. 1 is a block diagram of the basic architecture of the automatic alert mode selection circuitry for a handheld communications device according to one embodiment of the present invention. The alert mode selection circuitry 10 includes a processor 12 coupled to receive a set of environmental sensor input signals 11 produced by a corresponding set of sensors. Each of the sensor signals 11 provides physical parametric data of the surrounding environment of the handheld communications device. Processor 12 executes an algorithm implemented in the form of a programmed sequence of computer instructions that analyzes the sensor input data and generates an appropriate output response to an alert output control unit 13. Alert output control unit 13 produces one or more signals 15, which are coupled to a variety of alert units, in response to the signals generated by processor 12. These alert units may provide audible, visual, or other physical (i.e., vibration, temperature, etc.) outputs that can be used to alert the user of an incoming or received transmission.

In certain cases, a temporal sequence of alert output signals may be produced that varies over time. By way of example, a basic sequence may comprise an initial vibration or several vibrations followed by a low volume ring or chirp, followed by a louder ring, flashing lights, or some combination of the above. Detailed examples of different outputs and sequences of outputs appropriate for different environmental conditions and locations will be discussed shortly.

Practitioners familiar with digital circuitry will understand that in certain embodiments, processor 12 and control unit 13 may be replaced by a single device, such a microcontroller, or by a processor that is coupled to ordinary driver circuitry connected to the alert signal units. In still other embodiments, processor 12 and controller 13 may be substituted with ordinary combinatorial logic implementing a state transition table or diagram. This latter configuration, for example, could be used in conjunction with conventional threshold detection circuitry for determining when an input sensor signal exceeds a predetermined threshold level. State transitions would occur based on the digitized sensor input data, with each state producing a combination of output signals that drive the various output alert units.

Figure 2:
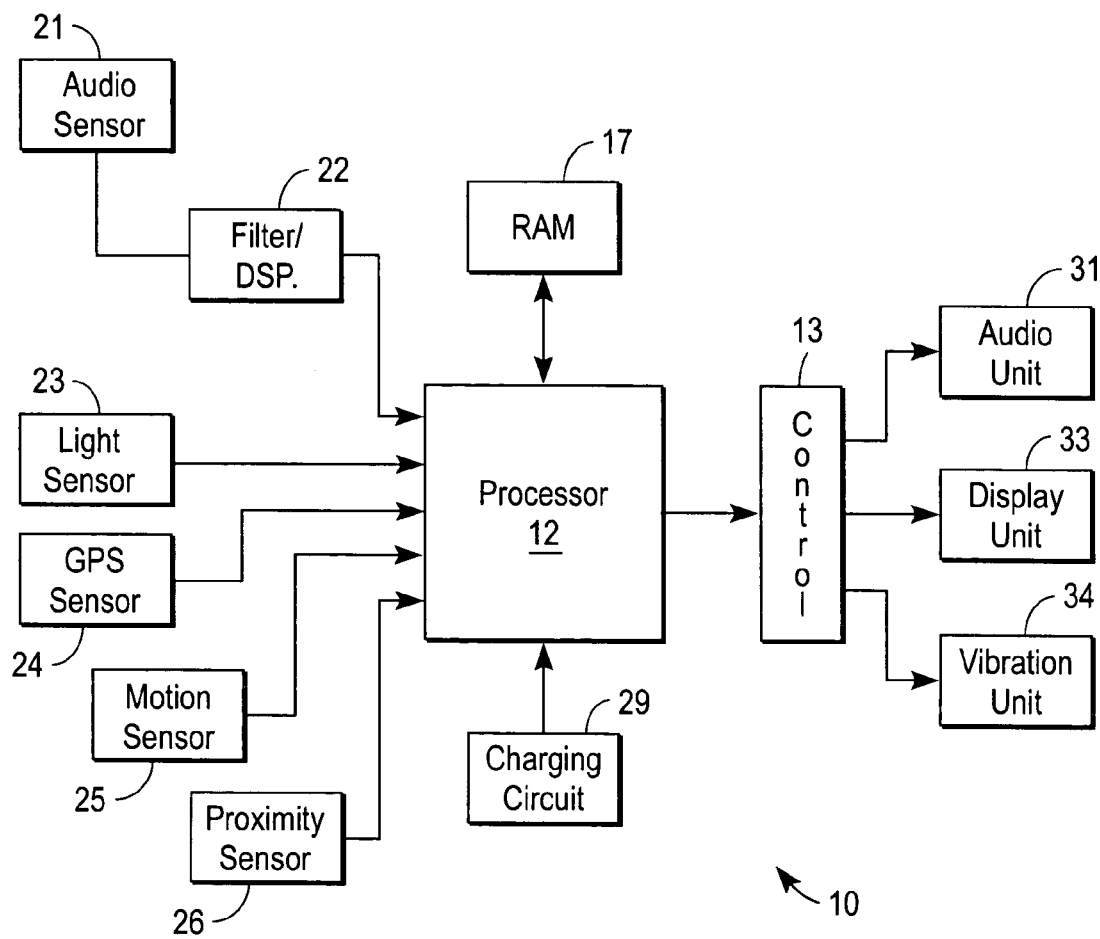
FIG. 2 is a circuit block diagram illustrating with one embodiment of the present invention.

With reference now to FIG. 2, there is shown a detailed circuit block diagram of alert mode selection circuitry 10 according to one embodiment of the present invention. As in the case of FIG. 1, alert mode selection circuitry 10 includes a processor 12 coupled with a control unit 13. A random-access memory (RAM) 17 is also shown coupled with processor 12. RAM 17 may store program instructions for the algorithm or state-transition information used to determine the appropriate alert mode responsive to the sampled environmental inputs. RAM 17 may also be used by processor 12 as a scratch memory for performing calculations, or to store map database information used in conjunction with GPS location information provided by GPS sensor 24.

The embodiment of FIG. 2 illustrates an audio sensor 21 coupled to a filter/digital signal processing (DSP) unit 22 that provides an audio signal input to processor 12. In certain implementations, unit 22 may also include a digital audio equalizer. One purpose of filter/DSP unit 22 is to process the sampled audio noise levels so that processor 12 may determine both the type (e.g., based on frequency spectrum) and loudness (decibels) of the noise environment surrounding the handheld device. Typically, processor 12 maintains a running sample of the latest noise levels and determines the nature of the surrounding sound (e.g., music, speech, diffused or "white" noise) based on the signals provided by filter/DSP unit 22. This audio information may be used to adjust the audible alert levels output by audio unit 31.

According to the present invention, the audio output volume setting is dynamically adjusted based a sampling of the audio spectrum surrounding the handheld communications device. Wind noises, crowd noises, white noises, etc., are identified by either filter/DSP unit 22 or processor 12 so that the algorithm can intelligently set the alert output volume. For example, in cases where the noise level is increasing in the environment, the alert audio output signal of the handheld device may be increased to a level adequate to alert the user. Conversely, in cases where environmental noise levels are decreasing, the audible alert level may be dynamically lowered. In other words, because a user could be constantly changing operating environments, the volume setting of audio unit 31 is continually adjusted, i.e., on a dynamic basis, to appropriately adapt to the current environment. In this manner, users are unlikely to miss audible call alerts due to extraneous surrounding noise sources. Likewise, in quiet environments, blaringly loud rings are avoided since the present invention operates to set the ring volume and ring tone frequency (including frequency equalization) so that it can be comfortably heard by the human ear. Other embodiments may include a set of audio profiles that may be selected manually by the user to best match that person's personal hearing spectrum or audio comfort level.

In certain applications identifying the nature of the surrounding sound is important in order to determine the appropriate type of alert mode setting. By way of example, if processor 12 may determine that the audio input represents conversational speech and the proximity sensor 26 detects that the user is in close proximity to the handheld device. This combination may specify a vibrate-only response by vibration output unit 34. In the event that the user fails to answer the incoming call within a predetermined number of vibration events, the vibration output may be supplanted by a series of low level rings or chirps that gradually increase in volume over time if the user does not answer. The alert mode might also include a flashing light output (including color variations) from display unit 33, especially in situations where light sensor 23 detects a dark surrounding. In other words, it should be understood that an appropriate alert mode output response may comprise a sequence of outputs from one or more of units 31, 33, or 34.

For user proximity detection, proximity sensor 26 may incorporate ultrasonic, capacitive/inductive, or other well-known sensors for detecting the distance between the handheld device and a human body. In cases where the distance between the user and the device has increased (i.e., the user removes the cell phone from his pocket and places it on a desk) the automatic alert mode algorithm may cause the handheld device to transition from a vibrate mode to an audible or visual alert mode. On the other hand, when a user picks up the phone and puts it in his pocket again, the alert mode apparatus of the present invention might automatically transition from an audible or visual alert mode back to a vibrate mode. Since the alert mode selection occurs automatically, the user is not required to manually change the alert mode setting. That is, an optimal alert mode setting for a particular sensed environmental condition is intelligently selected without inconveniencing the user. Incidences of unwanted ringing and missed alerts are therefore greatly reduced.

The block diagram of FIG. 2 further includes a conventional motion sensor 25 for detecting movement and orientation of the handheld communications device. In cases where significant movement of the device is detected, for example, processor 12 may select an alert mode that does not include a vibration output from unit 34. Similarly, if sensor 25 detects that the device is oriented with the display facing downward, the automatic alert mode selection circuitry of the present invention may select a mode that does not include a visual alert output from unit 33.

Location information provided by GPS sensor 24 may be utilized to either inhibit incoming calls or select an alert mode that is appropriate for certain noise or call restricted locations. By way of example, in the case where processor 12 determines that the user is in a hospital based on GPS location information provided by sensor 24, an alert mode setting may be automatically selected that does not include any audible output from unit 31. In more restricted areas, such as prisons, courtrooms, etc., incoming calls may be blocked or diverted to a message answering service. Practitioners in the relevant arts will appreciate that RAM 17 may store map data of restricted or sensitive locations for use by processor 12 in conjunction with the location signals provided by sensor 24.

The embodiment of FIG. 2 also includes an optional charging circuit coupled with processor 12 for indicating when the handheld device is connected with a battery charger. Charging information may be used by processor 12 to select an alert mode that disables vibration unit 34 since vibration is generally pointless when the device is being charged.

Figure 3:
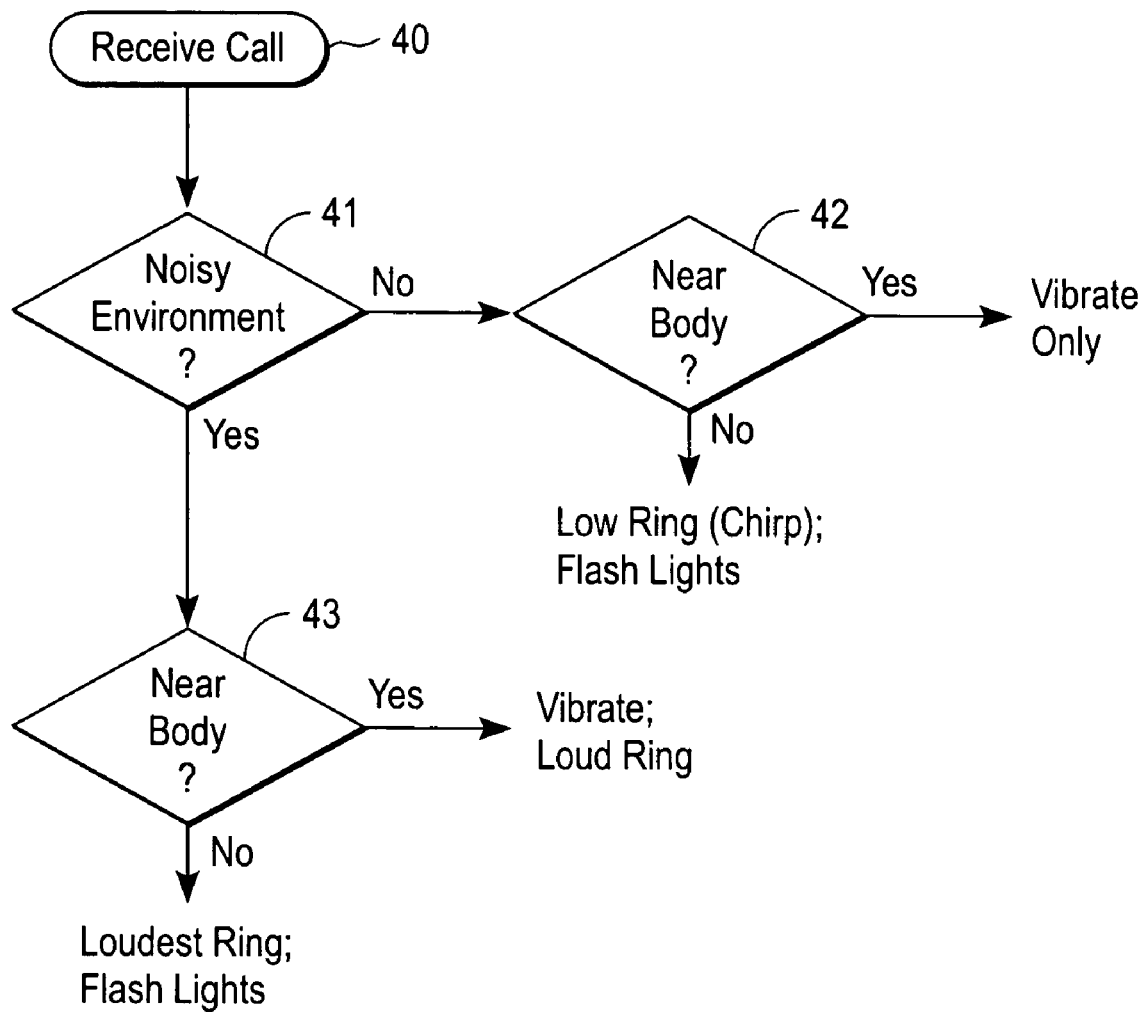
FIG. 3 is a flow chart diagram illustrating an exemplary method of operation according to one embodiment of the present invention.

FIG. 3 is a flowchart that illustrates a basic method for automatic alert mode selection in accordance with one embodiment of the present invention. The steps shown in FIG. 3 may comprise a manufacturer-programmed algorithmic code for execution by processor 12, or, alternatively, a user-programmed alert mode response. The method begins at block 40 wherein an incoming call or transmission is received by the handheld device. At the time the call is received processor 12 determines the noise level of the surrounding environment, which step is shown occurring at decision block 41. In the case of a quiet environment, the next inquiry is to determine whether the device is near a human body based on input data provided by a proximity sensor (block 42). If the device is in close proximity to the user a vibrate-only alert mode is selected. On the other hand, if the device in not near the user then a combination or sequence of alert outputs is selected that includes a low volume ring (e.g., a chirp) and a flashing light display.

In the case where a noisy environment is detected (i.e., a transition to block 43) and the device is near the user, a vibrate alert mode is selected. In the event that the user fails to answer the vibrate alert within a specified time, a loud ring alert may occur. Finally, when a noisy environment is detected and the handheld device is not in close proximity to the user, an alert mode is selected that includes a loudest ring output together with flashing lights.

Figure 4:
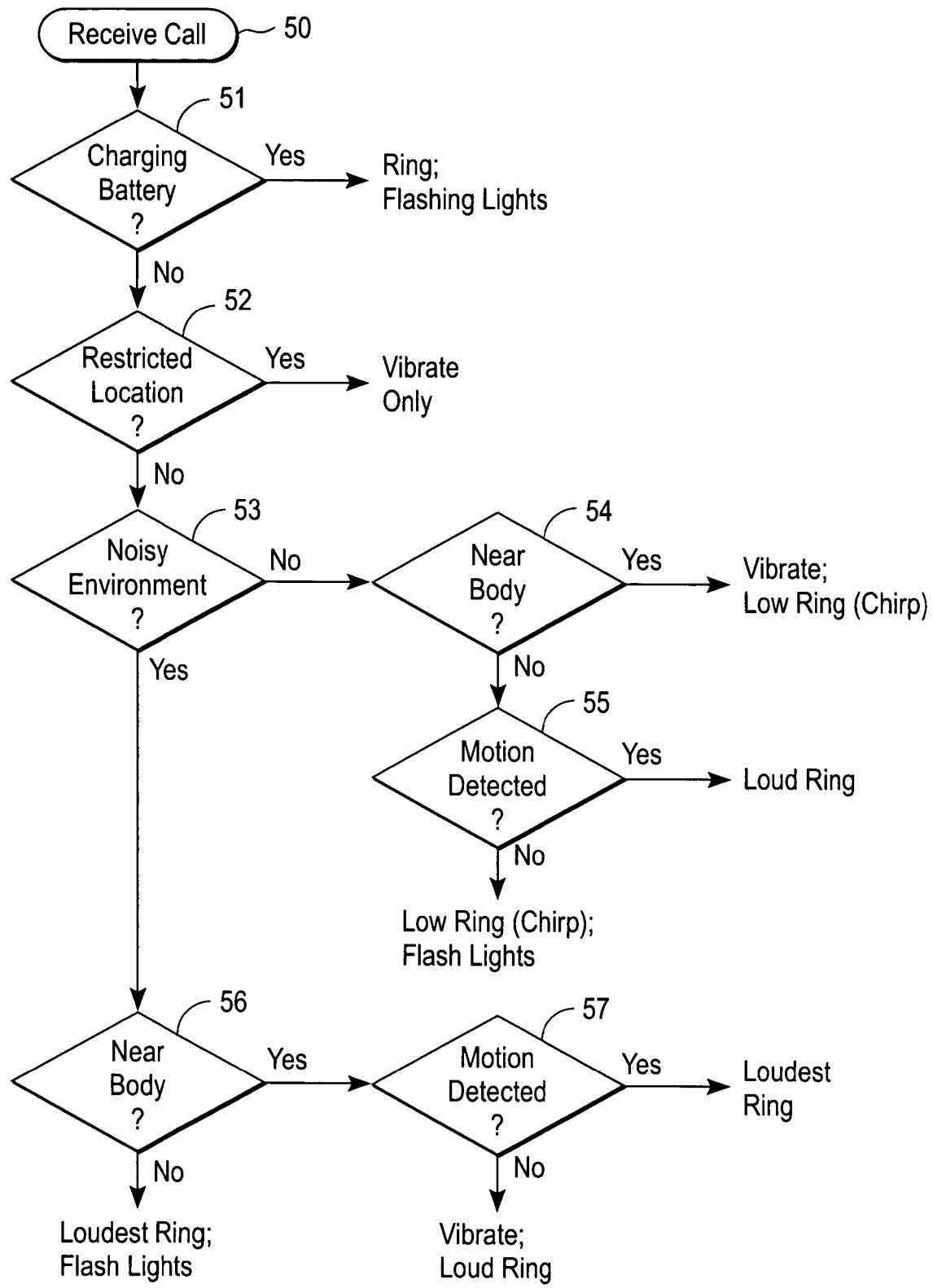
FIG. 4 is a flow chart diagram illustrating a method of operation according to another embodiment of the present invention.

FIG. 4 is a flowchart that illustrates another embodiment of a method for automatic alert mode selection in accordance with the present invention. The method begins at block 50 wherein an incoming transmission is received by the handheld device. At decision block 51, the processor running the automatic alert mode algorithm determines whether the device is currently connected to a battery charger; if it is, an alert mode is selected which includes an audible ring and flashing lights, but no vibration output. In the event that the device is not being charged, the processor correlates the device's present location (based on GPS sensor data) with a database of known restricted areas. If the handheld device is currently in a restricted location, a vibrate-only alert mode is selected.

In the case where the handheld device is not in a restricted location and not being charged, a determination of the noise level of the surrounding environment is made (block 53). In the case where the device is currently in a quiet environment and near a body (block 54), a vibrate/low ring alert mode is selected. In the case where the device is in a quiet environment, not near a body, and motion is detected (block 55), a loud ring alert mode setting is selected. In the case where no motion is detected, the device is in a quiet environment and not in close proximity to a body, a low ring/flashing light setting is selected.

In the case where the handheld device is not in a restricted location, not being charged, in a noisy environment, and not near a body (block 56), a loudest ring/flashing light alert mode setting is selected. Where the handheld device is not in a restricted location, not being charged, in a noisy environment, near a body, and movement is detected (block 57), a loudest ring alert mode setting is selected. Conversely, when there is no movement of the device and not being charged, not in a restricted location, in a noisy environment, and near a body, a vibrate/loud ring setting may be selected.

Practitioners in the communications arts will appreciate that even though the methods shown in the examples of FIGS. 3 & 4 depict relatively simple threshold level (i.e., yes/no) decision-making processes as applied to sensor data, other embodiments may implement a much more complex algorithm based on analog data provided by a multitude of sensors for input to one or more data processing units. That is, the present invention is not limited to threshold or discrete sensor mechanisms or data levels but may extend broadly to a wide variety of sensor devices and complex data processing algorithms.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a handheld by way of data signals embodied in a carrier wave or other propagation medium via a communication link (e.g., a modem or wireless network connection).

Furthermore, although the present invention has been described in conjunction with specific embodiments, those of ordinary skill in the computer networking arts will appreciate that numerous modifications and alterations are well within the scope of the present invention. Accordingly, the specification and drawings are to be regarded in an illustrative rather than a restrictive sense.

I claim:

1. Apparatus for automatically alerting a user of a handheld communications device of an incoming transmission comprising:
    a plurality of sensors that produce signals indicative of a physical parameter of a surrounding environment of the handheld communications device, the sensors including a microphone that produces an audio signal, a global positioning system (GPS) sensor that produces a position signal, a motion sensor that produces a motion signal in response to movement of the handheld communications device, a proximity sensor that produces a proximity signal indicative of nearness to a human body, and a battery charging sensor that produces a charging signal which indicates when the handheld communications device is being charged;
    a memory that stores a database of transmission sensitive or restricted locations;
    one or more processors that executes a programmed set of instructions to determine an alert mode setting based on a combination of the signals;
    a plurality of output units that produce one or more sensory alert outputs in response to the alert mode setting;
    the one or more processors being operable to access the database to compare the position signal against the transmission sensitive or restricted locations, when the position signal indicates that the handheld communications device is in a transmission sensitive or restricted location, the alert mode setting being restricted to a non-audible alert output, when the position signal indicates that the handheld communications device is not in any of the transmission sensitive or restricted locations and the audio signal indicates that the handheld communications device is in a noisy environment, the alert mode setting comprising a high-volume audible alert output, and when the position signal indicates that the handheld communications device is not in any of the transmission sensitive or restricted locations, the audio signal indicates that the handheld communications device is in a noisy environment, the proximity signal indicates that the handheld communications device is near the human body, and the motion signal indicates movement of the handheld communications device, the alert mode setting including a vibration alert output and/or the high-volume audible alert output, and when the handheld communications device is being charged, the alert mode setting being automatically restricted to a non-vibration alert output responsive to the charging signal.

2. The apparatus of claim 1 wherein the one or more sensory alert outputs comprise a temporal sequence of alert outputs.

3. The apparatus of claim 2 wherein the temporal sequence of alert outputs includes the high-volume audible alert output and a visual display alert output when the position signal indicates that the handheld communications device is not in any of the transmission sensitive or restricted locations, the audio signal indicates that the handheld communications device is in a noisy environment, and the proximity signal indicates that the handheld communications device is not near the human body.

4. The apparatus of claim 1 wherein one of the sensors includes a light sensor, and one of the output units includes a display output unit that produces a visual display output.

5. The apparatus of claim 1 wherein the non-audible alert output comprises a vibration alert output.

6. The apparatus of claim 1 further comprising:
    a control unit coupled to receive processor output signals that represent the alert mode setting, in response to the processor output signals the control unit generating control signals that cause the output units to produce the one or more sensory alert outputs.

7. A method for automatically alerting a user of a handheld communications device of an incoming transmission comprising:
    generating a set of signals each of which is indicative of a physical parameter of a surrounding environment of the handheld communications device, the signals including an audio signal that indicates a noisy environment, a global positioning system (GPS) position signal that indicates a geographic position of the handheld communications device, a motion sensor that produces a motion signal in response to movement of the hand held communications device, a proximity signal that indicates nearness of the handheld communications device to a human body, and a battery charging sensor that produces a charging signal that indicates when the handheld communications device is being charged:
    determining an alert mode setting based on the set of signals according to a programmed algorithm,
        when the GPS position signal indicates that the handheld communications device is in a transmission sensitive or restricted location, the alert mode setting being restricted to a non-audible alert output,
        when the GPS position signal indicates that the handheld communications device is not in any of the transmission sensitive or restricted locations, the audio signal indicates that the handheld communications device is in a noisy environment, and the proximity signal indicates that the handheld communications device is not near the human body, the alert mode setting comprising a high-volume audible alert output,
        when the position signal indicates that the handheld communications device is not in any of the transmission sensitive or restricted locations, the audio signal indicates that the handheld communications device is in a noisy environment, the proximity signal indicates that the handheld communications device is near the human body, and the motion signal indicates movement of the handheld communications device, the alert mode setting comprising a vibration alert output and/or the high-volume audible alert output,
        and when the hand held communications device is being charged, the alert mode setting being automatically restricted to a non-vibration alert output responsive to the charging signal; and
    producing one or more sensory alert outputs in response to the alert mode setting, the one or more sensory alert including the non-audible alert output, the vibration alert output and/or the high-volume audible alert output.

8. The method of claim 7 wherein the one or more sensory alert outputs comprise a temporal sequence of alert outputs.

9. The method of claim 7 wherein the one or more sensory alert outputs includes a visual display output.

10. The method of claim 7 wherein the one or more sensory alert outputs further includes a low-volume audible sensory alert output, the alert mode setting comprising the low-volume audible sensory alert output and/or the vibration alert output when the GPS position signal indicates that the handheld communications device is not in any of the transmission sensitive or restricted locations, the audio signal indicates that the handheld communications device is not in the noisy environment, and the proximity signal indicates that the handheld communications device is near the human body.

11. The method of claim 7 further comprising:
storing in a memory a database of transmission sensitive or restricted locations; and
comparing the GPS position signal to the transmission sensitive or restricted locations stored in the database.

12. An apparatus comprising:
a plurality of sensors that produce signals indicative of a physical parameter of a surrounding environment of a handheld communications device, the sensors including a microphone that produces an audio signal, a global positioning system (GPS) sensor that produces a position signal, a motion sensor that produces a motion signal in response to movement of the handheld communications device, a proximity sensor that produces a proximity signal indicative of nearness to a human body, and a battery charging sensor that produces a charging signal which indicates when the handheld communications device is being charged;
one or more processors operable to execute a programmed set of instructions to determine an alert mode setting based on a combination of the signals;
a plurality of output units that produce one or more sensory alert outputs in response to the alert mode setting, the alert mode setting automatically restricting the one or more sensory alert outputs to a non-vibration alert output when the charging signal is produced by the battery charging sensor, when the position signal indicates that the handheld communications device is in any one of a plurality of transmission sensitive or restricted locations, the alert mode setting being automatically restricted to a vibrate-only alert output, when the position signal indicates that the handheld communications device is not in any of the transmission sensitive or restricted locations, the audio signal indicates that the handheld communications device is not in a noisy environment, and the proximity signal indicates that the handheld communications device is near the human body, the alert mode setting including a vibration and/or a low-level ring alert output, and when the position signal indicates that the handheld communications device is not in any of the transmission sensitive or restricted locations, the audio signal indicates that the handheld communications device is not in a noisy environment, the proximity signal indicates that the handheld communications device is not near the human body, and the motion signal indicates movement of the handheld communications device, the alert mode setting including a loud ring alert output.

13. The apparatus of claim 12 further comprising a memory that stores a database of transmission sensitive or restricted locations, the one or more processors being further operable to access the database to compare the position signal against the transmission sensitive or restricted locations, when the position signal indicates that the handheld communications device is in a transmission sensitive or restricted location, the optimal alert mode setting being restricted to a non-audible alert output.

* * * * *